Patented Jan. 7, 1941

2,227,797

UNITED STATES PATENT OFFICE 2,227,797

RESINS CONTAINING RUBBER

Cyril Aubrey Redfarn and Philip Schidrowitz, London, England, assignors to The British Rubber Producers' Research Association, London, England, a corporation of Great Britain No Drawing. Application October 12, 1938, Serial No. 234,708. In Great Britain September 22, 1937

5 Claims. (Cl. 260—768)

This invention relates to synthetic resins in which rubber enters into the composition, with more especial reference to the manufacture of moulding compositions, and has for its object inter alia to provide for the production of moulded articles having inter alia improved electrical characteristics.

The incorporation of rubber with phenol formaldehyde resins in the production of moulding compositions is already known, but as far as can be ascertained existing processes give only a mere mechanical mixing of rubber into the composition, this admixture taking place at any time during the preparation of the resin, or later during the incorporation with fillers, catalysts and the like.

In co-pending application Serial No. 234,720, E. H. Farmer and J. W. Barrett, there is described a method of combining rubber with maleic anhydride to form reactive derivatives.

According to the present invention a process for the preparation of synthetic resinous products consists in simultaneously treating rubber with maleic anhydride and a phenol at elevated temperature and subsequently condensing the rubber, maleic anhydride, phenolic product with an aldehyde.

Preferably the rubber, maleic anhydride, phenol reaction is carried out in the presence of oxygen or air whereby it is considerably accelerated and during which probably some degradation and possibly also cyclisation of the rubber take place. Conveniently also the ratio of rubber to maleic anhydride is three units of isoprene ($C_5H_8$) to one unit of maleic anhydride ($C_4H_2O_3$), although satisfactory resins are obtained with as little as one-fifth of this amount of maleic anhydride which is conveniently added in successive portions during the reaction.

For the preparation of moulding compositions the next stages of the process conveniently follow the accepted practice for phenol formaldehyde in so far as the phenol-maleic anhydride rubber complex is condensed in an acid medium with formaldehyde sufficient only to give a substantially non-hardening resin which is then incorporated by hot rolling with fillers such as wood-flour, colouring substances, a mould lubricant such as stearic acid and hexamethylene tetramine as hardening agent in sufficient quantity to bring the phenol formaldehyde ratio to 1:1.5. For the preparation of resins for other purposes, e. g., when a hardening resin is desired, the proportion of formaldehyde may be increased as will be understood.

The present invention thus comprehends a process by which rubber appears to be chemically combined with the phenol formaldehyde type of resin so that a moulding composition is produced in which the bonding medium consists of rubber and phenol formaldehyde linked chemically by a maleic anhydride nucleus and which has been found to have improved characteristics. While it is believed that the rubber is substantially chemically combined—it is, for example, not separable by the ordinary mechanical or physical methods from the resin—it is not desired to limit the invention to a specific theory.

*Example 1*

In the practice of the invention according to one example, 50 gms. of crepe rubber, 12.5 gms. of maleic anhydride and 270 gms. cresylic acid (of approximately 55% meta content) are heated under reflux with a slow stream of oxygen or air running through until a clear liquor which does not separate on cooling is obtained. To prevent undue charring of the rubber it is preferable to heat this reaction mass in an oil bath at 160°–180° C. for 2–3 hours, by which time the rubber is completely dispersed, then to add a further 12.5 gms. maleic anhydride to make a total of 25 gms., followed by three hours boiling under reflux on a gauze. The liquor is then cooled, 187 ccs. 40% formaldehyde solution added, the mixture refluxed until water separates out, and then vacuum distilled to give a product which is brown, transparent and hard when cold. By using rubber or preferably softened rubber (prepared for instance according to specification No. 2,030,191) which has been milled with a proportion of the phenol this refluxing time can be substantially reduced.

The resin may be cold mixed with for example an equal weight of 80 mesh wood-flour and with 12% hexamethylene tetramine, 4% nigrosine, 1% lime and 2% stearic acid, all calculated on the resin content and then hot milled on rollers at 90° C. until the material is judged to retain only just sufficient plasticity to cure in the minimum time when disintegrated and moulded.

In the condensation of the rubber maleic anhydride phenol complex with formaldehyde, catalysts such as sulphuric or oxalic acid may be added to hasten the combination, but it has been found that the reaction proceeds quite rapidly enough in the absence of added catalysts. This may be due either to the catalytic effect of free maleic acid, or to the enhanced re-activity of the phenol owing to its combination with maleic anhydride and rubber.

The moulding times of the powders obtained are comparable with those of commercial phenol formaldehyde moulding powders and moulded test pieces have been found to have superior electrical properties to ordinary commercial wood-flour filled phenol formaldehyde moulded products.

The following table is indicative of the improved characteristics obtained with the product according to the invention over a typical wood-flour phenol formaldehyde moulded product:

| | Volume resistivity megohms per cm. cube at 19° C. | Surface resistivity megohms per cm. sq. at 20° C. | Electrical strength volts per mm. at 21° C. |
| --- | --- | --- | --- |
| Commercial phenol formaldehyde wood-flour filled moulding powder | $6 \times 10^4$ | $2.2 \times 10^5$ | 11,260 |
| Rubber moulding composition | $9 \times 10^6$ | $2.9 \times 10^7$ | 12,700 |

In addition the rubber composition showed a greater resistance to tracking under the test given by Blakey, British Plastics, November 1935, page 250.

Various samples of resin made in this way have been examined, particularly with the object of determining to what extent the rubber is combined with the phenolic component. In the first place rubber-maleic anhydride complexes prepared by the method described in co-pending application Serial No. 234,720 are generally insoluble, particularly if the additional reaction is carried on for any appreciable length of time. For contra the resinous mass obtained from rubber, maleic anhydride, phenol, and formaldehyde is soluble in methyl cyclohexanone and acetone, and hence it was concluded that there could be no rubber maleic anhydride complex independent of the phenolic component.

Next, the powdered resin was Soxhlet-extracted with carbon tetrachloride, and an extract amounting to 11% of the resin weight was obtained. This extract was treated with dilute alkali to remove any free phenol etc., and a residue of 2% uncombined rubber on the original resin was left. An examination of such a residue by combustion yielded figures in accordance with the view that it consists of oxidised degraded rubber. It will be noticed that the dilute alkali extract amounts to 9% of the resin weight; this extract probably consists of uncombined phenol or low molecular weight phenolalcohols, and the amount is normal for phenolic resins of the Novolak type. As the total amount of rubber introduced into the resinification mix would amount to about 14% of the finished resin, it would appear that there is approximately 12% of combined "rubber" present in the resin.

With regard to the reactions taking place in the formation of the rubber-phenolic complex, during the first refluxing stage in the presence of a stream of oxygen or air, it is believed that there is simultaneous combination of maleic anhydride with rubber by addition at the double bonds and esterification of the acid anhydride group with phenolic hydroxy-groups, and at the same time a certain amount of degradation, oxidation, and cyclisation of the rubber may take place. In the second refluxing stage with formalin the generally accepted methylene-bridge formation, chiefly ortho to ortho, to give chain compounds is assumed to take place. Finally, when the material is heated with hexamethylenetetramine, cross-linking by methylene bridges, chiefly para to para, to give an infusible product is assumed to take place by a similar mechanism to that now generally accepted for plain phenol-formaldehyde moulding compositions.

*Example 2*

At the present time maleic anhydride is the most expensive constituent, and the following example indicates how a satisfactory resin may be obtained with a considerably smaller proportion of maleic anhydride:

50 gms. crepe rubber, 270 gms. phenol, 2.5 gms. maleic anhydride are refluxed with a slow stream of oxygen running through until a clear solution is obtained. A further 2.5 gms. maleic anhydride are added and the liquor refluxed for four hours at 180° C. with oxygen running through.

216 ccs. formalin containing 0.6 gm. oxalic acid are then added at 60° C. and the liquor again refluxed at the boiling point for 40 minutes. Finally vacuum distilled to give a clear resin which is hard when cold.

*Example 3*

The rubber content may be increased as shown by the following example:—

100 gms. rubber, 50 gms. maleic anhydride and 270 gms. cresol are refluxed for 12 hours at the boiling point with a slow stream of oxygen or air running through, by which time the rubber is completely dispersed. The maleic anhydride may be added in portions at successive stages of the refluxing period. 187 ccs. formalin are added at 60° C. and refluxed until water separates out followed by vacuum distillation to give a clear resin which is solid when cold.

The above examples indicate the different formaldehyde equivalents of phenol and cresol respectively, and that the maleic anhydride and rubber proportions may be widely varied within the range aforementioned.

It will be understood that the process is not confined to the particular examples furnished and that other phenols may be used, that solutions of formaldehyde or its polymers may be used and that the phenol formaldehyde ratio may be from 1:0.7 to 1:2.5 and that varying quantities of rubber with varying amounts of maleic anhydride may be utilised, or less rubber with the appropriate amounts of maleic acid may be employed, although with increasing amounts of rubber the refluxing time is progressively extended. Further that the complex may be condensed with formaldehyde in an acid or in an alkaline medium.

Crepe, smoked sheet, softened rubber, nitrite crumb or even latex may be employed and vulcanising ingredients such as sulphur and accelerators may be added to the moulding composition.

Further, other fillers than wood-flour and in different proportions may be used, as is the usual commercial practice.

By the present invention synthetic resins especially suitable for use in moulding compositions giving products with improved electrical characteristics are conveniently obtained.

What we claim is:—

1. A process for the preparation of synthetic resinous products consisting in simultaneously treating rubber with maleic anhydride and a phenol at elevated temperature and subsequently condensing the rubber, maleic anhydride, phenolic product with an aldehyde.

2. A process according to claim 1 wherein the reaction is considerably accelerated by being carried out in the presence of oxygen or air.

3. A process for the preparation of synthetic resinous products consisting in simultaneously treating rubber with maleic anhydride and phenol at elevated temperature in the presence of oxygen or air and subsequently condensing the rubber, maleic anhydride, phenol product with formaldehyde in an acid medium.

4. A process for the preparation of moulding compositions consisting in simultaneously reacting rubber with maleic anhydride and phenol at elevated temperature and in the presence of oxygen or air and subsequently condensing the rubber maleic anhydride phenol complex with formaldehyde in the phenol formaldehyde ratio of 1:1.5.

5. A process for the preparation of moulding compositions according to claim 4, wherein fillers such as wood flour, a hardening agent such as hexamethylenetetramine, a mould lubricant such as stearic acid and/or colouring substances are incorporated with the resinous product by hot mixing.

CYRIL AUBREY REDFARN.
PHILIP SCHIDROWITZ.